United States Patent [19]

Michelson et al.

[11] 3,920,521

[45] Nov. 18, 1975

[54] SUPEROXIDE DISMUTASES AND THEIR APPLICATIONS AS OXIDATION INHIBITORS

[75] Inventors: Adolf Michael Michelson, Chatenay-Malabry; Jacques Monod, Paris, both of France

[73] Assignee: Agence Nationale de Valorisation de la Recherche (ANVAR), Neuilly-sur-Seine, France

[22] Filed: Apr. 16, 1975

[21] Appl. No.: 461,426

[30] Foreign Application Priority Data

Aug. 10, 1973 France .............................. 73.29328

[52] U.S. Cl. ..................... 195/55; 426/61; 426/542; 426/541
[51] Int. Cl.² ............................................. A23L 3/00
[58] Field of Search ........................... 195/1–4, 126, 195/12, 31, 96, 121, 123, 51 R; 426/321, 328, 61, 63, 64

[56] References Cited
OTHER PUBLICATIONS
McCord et al., "Superoxide Dismutase," Journal of Biological Chemistry 244 (1969), pp. 6049–6055.

Webb et al., "Fundamentals of Dairy Chemistry," Oxidative Deterioration in Dairy Products, Avi Publishing Co. (1965), pp. 204–207.

*Primary Examiner*—A. Louis Monacell
*Assistant Examiner*—R. B. Penland
*Attorney, Agent, or Firm*—Hammond & Littell

[57] ABSTRACT

The invention relates to the application of superoxide dismutases for inhibiting the degradation of autooxidizable substances.

An effective amount, preferably from 1 to 200 units per milliliter or per gram of substance, of at least one superoxide dismutase is associated with the substances to be protected.

Application notably to preserving foodstuffs, bacteria, viruses and other oxidizable substances.

16 Claims, No Drawings

SUPEROXIDE DISMUTASES AND THEIR APPLICATIONS AS OXIDATION INHIBITORS

This invention relates to the application of superoxide dismutases as oxidation inhibitors, notably as oxidation inhibitors for foodstuffs and other compounds or oxidizable media.

It has now been discovered that superoxide dismutase enzymes of any origin are remarkably effective as oxidation inhibitors for oxidizable substances, and notably as oxidation inhibitors for lipid, protein or lipiprotein foodstuffs, as well as other substances and oxidizable media.

The object of the invention according to the present application is the application of superoxide dismutase enzymes as oxidation inhibitors for oxidizable substances, notably foodstuffs, antioxidants used in the foodstuff industry, and bacteria and other oxidizable media.

In another aspect, the invention relates to a process for controlling the oxidation of oxidizable substances, characterized in that an effective amount of at least one superoxide dismutase enzyme is associated with said substances.

Within the meaning of the present invention, "oxidizable substance" is taken to mean any substance liable to be degraded by oxidization involving superoxide ions.

The superoxide dismutases which have been found to be effective are, for example, those prepared according to the copending application, filed on even date in the name of Adolf Michael Michelson, and entitled "New superoxide dismutase and its application Ser. No. 461,379 as an oxidation inhibitor", from marine bacterial strains such as, for instance, strains of *Photobacterium phosphoreum*, *Photobacterium leiognathi* or *Photobacterium sepia*, among others; but can also be any other superoxide dismutases such as, an non-limiting examples, those extracted from *Escherichia coli*, fungi such as *Pleurotus olearius* or those extracted from blood, notably erythrocupreines. Among said different strains may be mentioned strains of *Photobacterium phosphoreum* No. ATCC 11,040, *Photobacterium leiognathi* No. ATCC 25,521, *Photobacterium sepia* No. ATCC 15,709, *Escherichia coli* No. ATCC 15,224 and *Pleurotus olearius* Gillet (Cryptogamy Laboratory, Paris).

The remarkable anti-oxidization effect of said superoxide dismutases has been demonstrated on mushrooms, apples and potatoes, among other foodstuffs. Said experiments are described in some of the examples to be found hereinafter.

However, it is impossible at present to devise polyvalent and truly objective techniques for appraising the quality of foodstuffs; it was therefore also decided to conduct experiments on particular models, which have the advantage of constituting typical models of a large number of foodstuffs and food compositions and whose integrity can be analyzed objectively. Thus, as a model of the inhibition of lipo-protein auto-oxidation, tests were effected on the auto-oxidation inhibiting activity provided according to the invention by dismutases on lysine RNA-t yeast ligase, a model representing all classes of lipo-proteins. Similarly, as the model of the generality of nucleo-proteins, the bacteriophage R 17, which is a ribonucleoprotein, was used. In another connection, oxidation of the pancreatic ribonuclease enzyme was tested as a model for foodstuffs of a strictly protein character.

In another connection, the efficacy of superoxide dismutases for protecting bacteria exposed to ultra-violet radiation from oxidization was also established, as also for the protection of a medium, known as the "Jeffries medium", containing sodium tetrathionate and active for the enrichment of Salmonella.

As was stated above, the superoxide dismustase enzyme used according to this invention can be extracted from any suitable source, such as: erythrocupreine, *Escherichia coli*, fungi such as *Pleurotus olearius*, marine bacterial strains such as *Photobacterium Phosphoreum*, *Photobacterium leiognathi* and *Photobacterium sepia*, and the like. Whatever the source of the enzyme, assessment of its efficacy in the application in question remains the same, as it is measured in absolute terms: the activity of the enzyme is determined by inhibition of the chemioluminescence of luminol, a reaction produced by the enzyme system hypoxanthine/xanthine oxidase/oxygen; each time said reaction was effected, 1 ml $0.33 \times 10^{-4}$M hypoxanthine was injected into a mixture of 0.3 ml $10^{-3}$M luminol, 0.3 ml of 1 M, pH 9 NaOH glycine buffer, 0.3 ml $10^{-3}$M EDTA, 1.8 ml water and 0.005 ml of a 1 mg/ml xanthine oxidase solution. The experimental device used to determine light intensities (1) without, and (2) following, inhibition by means of superoxide dismutase was that described in the copending application, and comprising a silver-lined cuvette adapted to receive the mixture to be tested and positioned in front of a photomultiplier. The reaction was initiated by injecting the substrate into the cuvette, following which emission of a photon flux occurred which, in response to the photomultiplier, gave rise to a current the intensity of which was measured with a picoamperemeter and recorded. If a suitable amount of the superoxide dismutase to be determined was introduced into the reaction mixture, prior to reaction initiation, said light emission was inibited. The unit of activity selected corresponding arbitrarily to the amount of enzyme inducing a 50% reduction in the maximum light intensity in the absence of enzyme inhibition. Said unit is therefore independent of the enzyme source and the superoxide dismutase enzyme used.

In certain cases, it may be advantageous to activate oxidation of the materials to assess the efficacy of the superoxide dismutases in the application in question over a reasonable period of time. For this, the operation is in practice effected either with flavines reduced by 265 m$\mu$ irradiation, or by means of an enzyme system, such as a xanthine oxidase/hypoxanthine/oxygen system.

When oxidation is accelerated by reduced flavines, a solution of $10^{-4}$M flavine mononucleotide (FMN), a $10^{-3}$M EDTA and $10^{-2}$M, pH 7.0 phosphate buffer was irradiated in a quartz cuvette placed in a Zeiss spectrofluorimeter provided with a M365 filter, photoreduction, which occurs rapidly, is followed by observing the decrease in the intensity of fluorescence emitted at 530 m$\mu$.

At the end of reduction, the solutions are recovered and stirred vigorously in the presence of air, this resulting in their complete reoxidation, which produces $O_2^-$ superoxide ions. It should be noted that said flavine reduction-reoxidation cycle can be repeated several times without the structure of the mononucleotide being impaired. As a variant, irradiation at 365 m$\mu$ can be effected with a B100 A lamp produced by Ultraviolet Products, Inc., on constantly stirred solutions such as those described hereinabove.

When it is desired to accelerate oxidation by the hypoxanthine/xanthine oxidase/oxygen enzyme system, it is advantageous to use a solution containing 0.3 ml $10^{-3}$M hypoxanthine, 0.03ml 1M, pH 7.8 phosphate buffer, 0.3 ml $10^{-3}$M EDTA, 2.1 ml water and 0.05 ml of a 1 mg/ml xanthine oxidase solution.

Consequently, from still another point of view, the invention relates to foodstuff compositions, compositions obtained from strains of bacteria or viruses or culture mediums comprising, in association with the said foodstuffs, bacteria, viruses or other constituents of the medium, an effective amount of a superoxide dismutase enzyme.

It is clear for those skilled in the art that the amounts of superoxide dismutase enzymes to be associated with the substance to be protected are not critical, and any man of the art is capable of determining the most suitable amounts in each specific case. Routine trials enable the efficacy of the protection provided by the enzyme to be determined, and the amount of enzyme to be modified accordingly if necessary, using for this purpose tests of activity similar to those described above.

It can however be indicated that, as an example, amounts of superoxide dismutase enzyme in the range of 1 to 100 units per milliliter or per gramme are particularly suited for the protection of auto-oxidable substances as they have been defined hereinabove.

As has been demonstrated in the above referred co-pending application, superoxide dismutases effectively protect lipids and anti-oxidants and other preservatives usually used in the food industry, by very strongly inhibiting the reactions connected with the production of the $O_2^-$ superoxide ion. It was notably established that the auto-oxidation of unsaturated lipids obtained from fish is very strongly inhibited by superoxide dismutases. Furthermore, other trials have shown that superoxide dismutases have a protective effect on the auto-oxidation of certain anti-oxidants, notably the anti-oxidants used for preserving foodstuffs, such as pyrogallol or ascorbic acid.

The invention is further illustrated by the following examples, which are illustrative of this invention rather than restrictive of its scope.

EXAMPLE 1

5 g of fresh mushrooms were used; these were thinly sliced and the coloured grills removed as they might have affected the colour of the medium and made it difficult to access the results.

The mushrooms so prepared were divided between several 100 ml beakers and 50 ml of a pH 7.8 (0.01M phosphate buffer) buffered solution containing 0.02% ascorbic acid was added.

50 units of superoxide dismutase of *Photobacterium leiognathi*, strain No. ATCC 25,521 was added to one of said beakers.

Each beaker was covered with a double sheet of paper and left to stand at laboratory temperature.

40 hours later, the optical density of the supernatent in each of the beakers was determined at 600 m$\mu$ the optical density found made it possible to deduce an average increase of 0.173 in the optical density for the controls, whereas the increase in optical density was only 0.092 for the supernatent comprising the superoxide dismutase. Oxidation in the beaker so treated was therefore 47% lower than it was in the control beakers.

EXAMPLE 2

Slices of apple were introduced into a solution of 3 units of superoxide dismutase of *Photobacterium leiognathi* strain No. ATCC 25,521 per ml, in a pH 7.8 phosphate buffer. A few minutes later, the apple slices were removed from the solution, placed in Petri dishes and left to stand; several days later, the slices so preserved were compared with slices prepared in the same manner but preserved without superoxide dismutase treatment. The latter were observed to be browner than those treated according to the invention.

EXAMPLE 3

Slices of potato were placed in beakers each containing 3units of superoxide dismutase of *Photobacterium leiognathi* strain n) ATCC 25,521 per ml in a pH 7.8 phosphate buffer, they were removed a few minutes later, placed in Petri dishes and left to stand. Four days late the treated slices appeared to be markedly less oxidized than identical slices subjected to the same treatment but without the addition of superoxide dismutase.

EXAMPLE 4

It is known that certain RNA-t yeast ligases are lipoproteins in which the enzyme activity is dependent upon the integrity of the lipid portion. A material is therefore available the breakdown of which can be objectively determined by a simple assessment of its enzyme activity and which, owing to its essentially lipoprotein composition, can be taken as a model for all lipo-protein foodstuffs.

The ligases used were extracted from yeast cells (*Saccharomyces cerevisiae*). The following procedure was used to prepare them: strains of *Saccharomyces cerevisiae* No. ATCC 9841 were cultured in a medium containing 30g glucose and 5g yeast extract, the culture being left to develop until the middle of the logarithmic phase of growth. Centrifugation was then effected, after which the cells were washed and ground in a device known as a French Press; 67g of yeast were thus treated with 67 ml buffer (consisting of 0.01 M tris pH 8, 0.01M $MgCl_2$? 1 ml EDTA, 10% glycerol and 2mM phenyl-methyl-sulfonium fluoride). Following three grinding steps in the device known as a French Press, the solution was cenrifuged for 30 minutes at 15,000 revolutions/minute. The supernatent was reduced and centrifuged again for 2 hours at 50,000 revolutions/minute. The supernatent from this last centrifugation was purified on a 2cm × 36 cm DEAE-cellulose DE-52 column comprising 80g of cellulose, the said column being equilibrated with 0.02M, pH 7.5 potassium phosphate buffer, 0.02 M mercaptoethanol, 1mM $MgCl_2$ and 10% glycerol. The said supernatent was poured into the column and washed with 370 ml of the same buffer. The ligases were then eluted with a 0.25 M, pH 6.5 potassium phosphate buffer, 0.02 M mercaptoethanol, 1 mM of $MgCl_2$ and 10% glycerol.

The optical densities of the fractions recovered at the bottom of the column were determined and activity was tested with lysine and the other amino acids (levels of activity were given in table I below). Each extract was then concentrated by ultrafiltration to a protein concentration of 10 mg/ml and determinations were effected by measuring the charge of RNA-t. 100 $\mu$l of the incubation medium were used, containing 50 mM N-morpho-lino-3-propane sulphuric acid (pH 6.5), 10 mM $MgCl_2$, 2mM ATP (adenosine-triphosphoric acid), 40 pM (picomoles) of carbon 14-labelled lysine and 10 units of total/yeast RNA-t with 260 m$\mu$ optical density.

After incubation for a predetermined period of time, 50 $\mu$l of the reaction mixture was deposited on Whatmann DE-81 paper and washed for one and one half hours with 8.7% acetic acid and 2.5% formic acid. The paper so washed was then dried and, on the spots formed, counting was effected using a scintillator mixture containing toluene.

To determine the efficacy of the protection of lysine RNA-t yeast ligase from oxidation obtained with a superoxide dismutase, a solution of 1.37 mg lipoproteins in 1 ml (0.5M) pH 7.5 phosphate buffer was formed and either 0.1% ascorbic acid, or 90 units of the superoxide dismutase of *Photobacterium leiognathi*, strain No. ATCC 25,521 was added; in each case, the solutions were left to stand at 4°C, aliquot parts were withdrawn at various times (see table 1 below) and enzyme activity was determined as previously described.

TABLE I

| Days | without protection | % activity with 1% ascorbic acid | with 90 units of *Photobacterium leiognathi* superoxide dismutase |
|---|---|---|---|
| 0 | 100 | 100 | 100 |
| 2 | 81 | 31 | 97 |
| 4 | 62 | 19 | 96 |
| 7 | 35 | 2.8 | 72 |
| 9 | 27 | 1.2 | 67 |

Similar results were obtained using the same number of units of superoxide dismutases obtained from *Pleurotus olearius Gillet*, *Escherichia coli* strain No. ATCC 15,224 or erythrocupreine.

EXAMPLE 5

In order to determine the protection from oxidation provided to bacteria by superoxide dismutase, luminescent bacteria of *Photobacterium leiognathi* strain No. ATCC 25,521 were used, the oxidation of which was artificially accelerated by photoreduction of FMN in order to render the phenomenon of protection perceptible over a shorter period of time. The bacteria were cultured at 28°C on a medium comprising 8g of nutrient broth, 10g NaCl, 15g agar-agar, and water to make up to 1000 ml, the pH of this medium being adjusted to 7. Cells were counted by spreading 0.1 ml of a bacterial solution diluted with physiological salt solution in Petri dishes maintained at 25°C and containing a medium consisting of 8g nutrient broth, 10g NaCl, 15g agar-agar, and water to make up to 1000 ml, the pH of said medium being adjusted to 7.

A culture of 100 ml *Photobacterium leiognathi* was centrifuged in exponential development (their optical density at 600 m$\mu$ was 0.3) at a velocity of 10,000 revolutions/minute, for 10 minutes at 3°C. The centrifugation residue was dispersed in 100 ml physiological salt solution. Said bacterial suspension was diluted 10 times in $5 \times 10^{-5}$M FMN and 3% NaCl (respective proportions) to a final volume of 10ml.

Bacteria was irradiated at 25°C at 365 m$\mu$ under a B100 A lamp and with constant stirring. After predetermined durations of exposure to the lamp, aliquot parts were withdrawn and the cells were counted, after which they had been further diluted with physiological salt solution. Whereas prior to irradiation $1 \times 10^7$ cells were present, after determined durations of irradiation the number of cells/ml counted are given in table II below.

TABLE II

| Duration of exposure | Control | Bacteria with 13.5 units/ml superoxide dismutase (in $10^{-2}$M pH7 phosphate buffer) |
|---|---|---|
| 30 | $4 \times 10^6$ | $7 \times 10^6$ |
| 60 | $5 \times 10^5$ | $3.9 \times 10^6$ |
| 120 | $8 \times 10^3$ | $6 \times 10^4$ |

EXAMPLE 6

Using the same procedure as in example 5, bacteria of *Photobacterium leiognathi*, strain No. ATCC 25,521 were put in suspension in a physiological salt solution to a final volume of 10 ml and said suspension was irradiated for 16 hours at 365m$\mu$ using a B100 A lamp (incident energy 5500 W/cm²). The suspension was then placed in Petri dishes to determine the survival rate of bacteria.

Although a very long period of irradiation, 16 hours, was used, it was observed that, based on a control test without superoxide dismutase, there were 3.3 times more surviving bacteria in the Petri dishes containing a suspension to which, prior to irradiation, there had been added 53 units per ml of superoxide dismutase (SOD) of *Pleurotus olearius* Gillet, the results obtained being as follows:

| Non-irradiated bacteria | $9.7 \times 10^4$ cells/ml |
|---|---|
| Irridiated bacteria (control) | $1.5 \times 10^2$ cells/ml |
| Irradiated bacteria (with 53 units/ml of *Pleurotus olearius* SOD) | $5.0 \times 10^2$ cells/ml |

EXAMPLE 7

A trial was conducted to preserve a bacteriophage, which is a nucleoprotein and will in the following be referred to as bacteriophage R 17. Said bacteriophage was preserved and diluted in a solution comprising 6g NaHPO$_4$, 3g KH$_2$PO$_4$, 0.5 g NaCl, 1g NH$_4$Cl, 100 ml water and 10ml 0.01M CaCl$_2$. 0.1 ml of said bacteriophage solution was incubated for ten minutes at 38°C with 0.2 ml of a solution of *Escherichia coli* strain n° ATCC 15,224, 10g trypticase, 5g yeast extract, 10g NaCl and 1000 ml water, and at an optical density of 0.5 at 650 m$\mu$ with 3 ml of soft gelose suspension (consisting of 8g agar, 10g trypticase, 1g yeast extract, 8g NaCl, 1000 ml water, 2 ml 1 M of CaCl$_2$ and 5 ml 20% glucose) which was maintained at 45°C. The mixture was poured into Petri dishes containing 20 ml hard gelose (consisting of 12 g agar, 10g trypticase, 1g yeast extract, 8g NaCl, 1000 ml water, 2 ml 1 M CaCl$_2$ and 5 ml of 20% glucose); and the Petri dishes were placed at a temperature of 37°C.

In order to accelerate the natural oxidation of bacteriophage R 17, photoreduction of flavin mononucleotide was used: the bacteriophage solution was diluted with 10 times its volume of a solution of $10^{-4}$M·FMN, $10^{-3}$M EDTA and $10^{-2}$M pH 7 phosphate buffer, photoreduction was effected with a spectrofluorometer, the final volume of the solution being 0.8 ml.

With a solution initially containing $4.1 \times 10^8$ infective particles/ml at moment $t = 0$, the results given in table III below were obtained.

TABLE III

PARTICLES/ ml

| Number of successive photoreduction operations | Control trial (comprising 0.05 mg dismutase inactivated at pH 3 (A) | with 13.5 units/ml dismutase (B) | Protection $\left(\text{relation } \frac{(B)}{(A)}\right)$ |
| --- | --- | --- | --- |
| 0 | $4.1 \times 10^8$ | $4.1 \times 10^8$ | — |
| 3 | $4.9 \times 10^7$ | $7.5 \times 10^7$ | 1.53 |
| 6 | $5 \times 10^6$ | $1.5 \times 10^7$ | 3.00 |
| 9 | $5 \times 10^5$ | $2 \times 10^6$ | 4.00 |

EXAMPLE 8

Proceeding as in the previous example, except that, in order to accelerate oxidation of the bacteriophage R 17, 0.3 ml of the latter was put to incubate with a hypoxanthine/xanthine oxidase/oxygen enzyme system, the volume of the incubation system being 3 ml.

After 15 minutes, the system was again treated by the addition of 0.05 ml xanthine oxidase and 0.3 ml $10^{-3}$M hypoxanthine.

With, at time zero, $5.0 \times 10^8$ particles/ml, the results given in table IV below were obtained in the absence and in the presence of 200 units/ml of superoxide dismutase obtained from Photobacterium sepia strain n° ATCC 15,709. Similar results were obtained with superoxide dismutases of Pleurotus olearius Gillet or erythrocupreine.

TABLE IV

| Number of successive enzyme operations | Particles/ml Without dismutase (control) | With dismutase (200 units) | Mortality % control | Mortality (with dismutase) |
| --- | --- | --- | --- | --- |
| 0 | $5.0 \times 10^8$ | $5.0 \times 10^8$ | — | — |
| 1 | $3.5 \times 10^8$ | $5 \times 10^8$ | 30 | 0 |
| 2 | $2 \times 10^8$ | $3 \times 10^8$ | 60 | 40 |

EXAMPLE 9

The protection of pancreatic ribonuclease from oxidation by the use of superoxide dismutases was tested by realizing oxidation by means of photoreduction of FMN to render the phenomenon perceptible over a more suitable period. For this purpose, a solution of pancreatic ribonclease solution (0.1 mg/ml in $10^{-2}$M, pH 7 phosphate buffer and $10^{-3}$M EDTA) was diluted in 10 times its volume of a solution consisting of $10^{-4}$M FMN, $10^{-3}$M EDTA and $10^{-2}$M, pH 7 phosphate buffer, the final volume being 0.8 ml, the pancreatic ribonuclease protein was thus subjected to several photoreduction cycles, in the absence, and in the presence of 67.5 units/ml superoxide dismutase obtained from Pleurotus olearis Gillet or in the presence of the same dismutase, denatured and inactive at pH3.

The activity of the ribonuclease enzyme was determined using a spectrophotometer, following the increase of the optical density at 280mµ of a ribonucleic acid solution such as described above. The results obtained are given in table V below:

TABLE V

| Number of cycles | % residual activity | | |
| --- | --- | --- | --- |
| | Control (without dismutase) | Control with dismutase (0.05 mg) inactivated at pH 3 | Dismutase 67.5 units/ml |
| 0 | 100 | 100 | 100 |
| 3 | 67 | 56 | 89 |
| 6 | 45 | 45 | 89 |
| 9 | 22 | 22 | 67 |

EXAMPLE 10

A superoxide dismutase enzyme, strain Photobacterium leiognathi No. ATCC 25,521, was used in an attempt to obtain improved preservation of the medium known as the Jeffries medium, containing sodium tetrathionate.

Said medium is a Salmonella enriching medium and is used conventionally as follows: a sample containing small amounts of Salmonella and large amounts of Escherichia coli is introduced into such a sodium tetrathionate medium. After 24 hours in an oven at 37°C, one drop of said culture was seeded on a gelose culture in a Petri dish. After 24 hours incubation at 37°C, a very large number of Salmonella colonies were observed in said culture but absolutely no Escherichia coli.

It was thus confirmed that the said sodium tetrathionate medium inhibits Escherichia coli but encourages the development of Salmonella. However, it was also confirmed that said medium can only really be used for a maximum period of three weeks, from the time it was prepared, and even, virtually, for a maximum of two weeks. For this reason it has only been possible up till now to produce small batches of such a medium, making it difficult to keep a check on stocks and thus increasing costs.

To carry out an experiment on the protection of Jeffries medium from oxidation, 100 tubes were taken from a same batch of said sodium tetrathionate medium; 2 ml of a Photobacterium leiognathi superoxide dismutase solution containing 15 units/ml were added to 11 of said tubes which each contained 20 ml of the medium, all the other tubes being considered as controls. All 100 tubes were kept together at a temperature of + 4.0°C.

Analyses were conducted to determine the preservation of the media at a rate of one analysis per week for 7 weeks and then only one analysis every second week. For each of said analyses one tube containing the enzyme was compared with:

1 control tube for the first three tests
2 control tubes for the 4th and 5th tests
3 control tubes for the last five tests.

The procedure described above at the beginning of this example was used for analysis.

The results are given in table VI below.

TABLE VI

| Weeks | Sodium tetrathionate + enzyme | Controls (sodium tetrathionate) 1st | 2nd | 3rd |
|---|---|---|---|---|
| 1 | + | + | //////// | //////// |
| 2 | + | + | //////// | //////// |
| 3 | + | + | //////// | //////// |
| 4 | + | + | — | //////// |
| 5 | + | + | — | //////// |
| 6 | + | + | + | — |
| 7 | + | — | — | — |
| 9 | + | + | + | + |
| 11 | + | + | 0 + | — |
| 13 | + | + | (mediocre) | 0 |

+ = satisfactory result: pure Salmonella culture
− = bad results: *E. coli* culture
0 = bad results: no culture It is immediately obvious from this table that the contents of tubes into which superoxide dismutase enzymes had been introduced retained all their properties. The control tube gave satisfaction in the first three tests, which corresponds to the duration of validity considered up to now to be normal for commercial batches of sodium tetrathionate. The following tests showed that results were irregular for the control tubes, which makes it possible to consider the product as a commercial proposition. It is therefore seen that a superoxide dismutase enzyme solution obtained from *Photobacterium leiognathi* strain No. ATCC 25,521 added at a rate of 2 ml per tube of 20 ml sodium tetrathionate lengthened the latter's resistance to oxidation by at least 10 weeks, and even longer.

EXAMPLE 11

Preserving potatoes

A - 250 g of peeled potatoes are cooked in water at 100°C for 30 minutes. 60ml of water is added and they are treated in a mixer until a homogeneous mass is obtained. Four 50 g samples are placed in beakers and 20 ml water is added and thoroughly mixed with the mash.

| Beaker | |
|---|---|
| P1 | Control |
| P2 | 50 units of superoxide dismutase (10 units/g) *P. leiognathi* are added and mixed |
| P3 | Control plus 0.5 ml 2.0% ascorbic acid(final concentration 0.02% ascorbic acid) |
| P4 | As P3 but 500 units of superoxide dismutase are also added. |

All the samples are then freeze-dried and left to stand at ambient temperature.

Potato flakes were used containing 25 mg/kg BHT (butylated hydroxy toluene) and BHA (butylated hydroxyanisole) and glycerol monostearate (1%).

45 g of the aforesaid flakes were added to 250 ml boiling water, the mixture was left for 2 minutes and stirred with a glass rod. Two 50 g samples of said mash are taken and mixed with 50 ml water.

| M1 | Control |
|---|---|
| M2 | 500 units superoxide dismutase (10 units/g mash) added and well mixed. |

The two samples are then freeze-dried and the powder left to stand at ambient temperature.

Two months later samples A and B were compared by six persons. The odour of the sample containing superoxide dismutase was different from that of the control, less acid and more pleasant.

Preserving carrots

Exactly the same procedure was used as that described for potatoes, the carrots being cooked in water and the same amount of superoxide dismutase/g being added.

The odour of the two samples was compared two weeks later by six persons. The odour of the sample containing a peroxide dismutase differed from that of the control and was less acid and more pleasant.

What we claim is:

1. A process to control auto-oxidation of substances liable to be degraded by oxidation with superoxide ions, wherein an anti-oxidation effective amount of at least one superoxide dismutase enzyme is added to said substances.

2. A process according to claim 1, wherein the said substances are selected from the group consisting of lipid, protein, nucleoprotein or lipo-protein foodstuffs.

3. A process according to claim 1, wherein the said substances are bacteria or viruses.

4. A process according to claim 1, wherein the said substances are culture mediums used for culturing cells.

5. A process according to claim 1, wherein the superoxide dismutase is incorporated in the said substance at rates of from 1 to 200 units of superoxide dismutase per milliliter or per gram of substance.

6. A process according to claim 1, wherein the superoxide dismutase enzyme is selected from those extracted from marine bacterial strains, from *Escherichia coli*, fungi or those extracted from blood, and notably erythrocupreines.

7. A process according to claim 6, wherein the said marine strains are strains of *Photobacterium leiognathi*, *Photobacterium phosphoreum* or *Photobacterium sepia*, notably *Photobacterium leiognathi* strain No. ATCC 25,521, *Photobacterium phosphoreum* strain No. ATCC 11,040 or *Photobacterium sepia* strain No. ATCC 15,709.

8. A composition consisting essentially of substances liable to be degraded by oxidation involving superoxide ions and an anti-oxidation effective amount of at least one superoxide dismutase enzyme to protect the said substances from oxidation or to reduce their oxidation.

9. A composition according to claim 8, wherein the said substances are selected from the group consisting of lipid, protein, nucleoprotein, or lipoprotein foodstuffs.

10. A composition according to claim 8, wherein the said substances are bacteria or viruses.

11. A composition according to claim 8 wherein the said substances are culture mediums used for culturing cells.

12. A composition according to claim 8, which comprises a protein composition and, in association with the protein liable to undergo oxidation, an effective amount of at least one superoxide dismutase enzyme.

13. A composition according to claim 8, wherein the superoxide dismutase is incorporated in the said substance at a rate of 1 to 200 units of superoxide dismutase enzyme per milliliter or per gram of substance.

14. A composition according to claim 8, wherein the superoxide dismutase enzyme is selected from those extracted from strains of marine bacteria, *Escherichia coli*, fungi, or those extracted from blood, notably erythrocupreines.

15. A composition according to claim 14, wherein the said marine strains are strains of *Photobacterium leiognathi*, *Photobacterium phosphereum* or *Photobacterium sepia*, notably *Photobacterium leiognathi* strain No. ATCC 25,521, *Photobacterium phosphoreum* strain No. ATCC 11,040 or *Photobacterium sepia* strain No. ATCC 15,709.

16. A composition consisting essentially of substances liable to be degraded by oxidation with superoxide ions selected from the group consisting of lipid, protein, nucleoprotein and lipoprotein foodstuffs, bacteria, viruses and culture mediums for culturing cells and an anti-oxidation effective amount of at least one superoxide dimustase enzyme extracted from *Escherichia coli*, fungi, blood, *Photobacterium leiognathi*, *Photobacterium phosphoreum* and *Photobacterium sepia* to prevent or reduce oxidation.

* * * * *